United States Patent Office 2,844,454
Patented July 22, 1958

2,844,454
BIOLOGICAL TOXICANT

Gail H. Birum, Dayton, Ohio, assignor to Monsanto Chemical Company, St. Louis, Mo., a corporation of Delaware No Drawing. Application February 25, 1954
Serial No. 412,622

8 Claims. (Cl. 71—2.7)

The present invention relates to biological toxicants and more particularly to compositions which are useful as bacteriostats, fungicides and herbicides.

According to the present invention there are provided valuable pest-destroying compositions containing as the effective toxic ingredient a complex addition product having the formula:

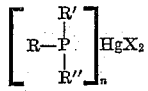

in which X is selected from the class consisting of chlorine, bromine and iodine, $n$ is an integer of 1 to 2 and R, R' and R'' are selected from the class consisting of alkoxy and alkyl radicals of from 1 to 8 carbon atoms.

The above formula includes complexes of mercuric chloride, bromide or iodide and the trialkyl phosphines such as trimethyl, tri-n-propyl, triamyl, tris(2-ethylhexyl), tri-n-octyl, amyl diethyl or butyl hexyl propyl phosphine; the complexes of mercuric chloride, bromide or iodide and alkanephosphonites such as diethyl methanephosphonite, di-n-butyl butanephosphonite, or dimethyl octanephosphonite; the complexes of mercuric chloride, bromide or iodide and alkyl dialkylphosphinites such as butyl di-n-octyl-phosphinite or methyl ethylmethylphosphinite; and the complexes of mercuric chloride, bromide or iodide and trialkyl phosphites such as trimethyl, triethyl, triisopropyl, tri-n-propyl, tri-tert-butyl, tri-n-amyl, tri-n-hexyl, tri-n-heptyl, tris(2-ethylhexyl), tri-n-octyl, amyl diethyl, butyl di-n-propyl or ethyl methyl n-octyl phosphite.

As shown in the above general formula, one or two moles of the trivalent phosphorus compound are combined with one mole of the mercuric halide. The presently useful trivalent phosphorus compound-mercuric halide complexes are obtainable by reaction of the mercuric halide with the trialkyl phosphite, the trialkyl-phosphine or the dialkyl alkanephosphonite. One method for their production comprises treating a mixture of mercuric chloride and anhydrous ether with the organic trivalent phosphorus compound at substantially room temperature and allowing the resulting mixture to stand until formation of the complex compound has taken place. Depending upon the molar ratio of the reactants and the reaction time, one or two moles of the organic phosphorus compound combine with one mole of the mercuric halide.

Particularly valuable are complexes in which 2 moles of a trialkyl phosphite having from 1 to 8 carbon atoms in the alkyl radical are combined with 1 mole of mercuric chloride. Such complexes are active toxicants when applied to living organisms in only very small concentrations, e. g., concentrations of from 1 part by weight of the complex to a thousand parts or even a million parts of inert carrier, depending upon the organism being treated and the nature of the individual complex used.

The presently useful complexes may be applied as toxicants by any suitable method, for example as sprays or as dusts. When used as sprays they may be employed in solution or in emulsion form. I have found that oil-in-water emulsions of the trivalent phosphorus compound-mercuric halide complexes possess an improved tendency to adhere to the treated organism and that less of the active ingredient, i. e., the complex, is required to give comparable biological toxicity. The emulsions are readily prepared by first preparing a solution of the complex in an organic solvent and then adding the resulting solution to water containing an emulsifying agent to form an emulsion. Emulsifying agents which may be employed are those customarily used in the art for the preparation of oil-in-water emulsions. The word "oil" is here used to designate any organic liquid which is insoluble in water. Examples of emulsifying agents which may be used include alkyl benzene sulfonates, long chained polyalkylene glycols; long chained alkyl sulfosuccinates etc.

The present invention is further illustrated, but not limited, by the following examples:

Example 1

Spray testing of the herbicidal activity of the complex of 2 moles of triethyl phosphite with 1 mole of mercuric chloride was conducted as follows: A cyclohexanone solution of the complex and an emulsifying agent were added to water, the quantity of solution employed being calculated to give emulsions containing 0.4 percent, 0.2 percent and 0.1 percent, respectively, of the complex, based on the total weight of each emulsion. The quantity of emulsifying agent used was 0.2 percent by weight based on the total weight of each emulsion. The emulsifying agent comprised a mixture of a polyalkylene glycol derivative and an alkylbenzenesulfonate. Bean plants were respectively sprayed with each emulsion. The spraying was continued until droplets formed on and/or fell from the sprayed plants. The sprayed plants, as well as 2 untreated blank specimens and 2 specimens which had been treated with the emulsion in absence of the complex, were then allowed to remain under standard conditions of sunlight and watering for a period of one week. At the end of that time, observation of the sprayed plants showed that plants which had been treated with emulsions containing either 0.4, 0.2 or 0.1 percent of the tri-ethyl phosphite-mercuric chloride complex were completely dead, whereas the untreated blank specimens and those which had been sprayed with the complex-free emulsion were in excellent condition.

Example 2

The 2:1 triethyl phosphite-mercuric chloride complex was tested against the fungus *Aspergillus niger* employing the following testing procedure: A 1% stock solution of the complex in a non-toxic solvent was made up, and this solution was added to sterile, melted dextrose agar in a quantity to give 1 part of complex per 1,000 parts of agar. After thorough mixing the agar was poured into Petri dishes and allowed to harden. One drop of a spore suspension of the fungus served as inoculum for each plate. The inoculated plates were incubated at a temperature of 25° C. for 5 days. At the end of that time inspection of the dishes showed complete inhibition of growth of the test fungus, whereas blank test specimens, i. e., agar containing none of the complex but similarly inoculated and incubated showed extensive fungus growth.

Example 3

This example shows testing of the 2:1 triethyl phosphite-mercuric chloride complex against *Micrococcus pyogenes* var. *aureus* and *Salmonella typhosa*. The 1% stock solution of complex was added to a nutrient agar to give test samples containing 1 part of the complex per 10 thousand parts of the agar, 1 part of the complex per 100 thousand parts of the agar and 1 part of the complex per million parts of the agar. Petri dishes were respectively filled with each of the 3 test mixtures, and the plates thus prepared were then respectively inoculated with said *pyogenes* and said *typhosa* organisms and incubated for 5 days at a temperature of 25° C. At the end of that time inspection of the plates showed complete inhibition of growth of both the *pyogenes* and the *typhosa* by each of the three test samples, whereas "blank" inoculated nutrient agar plates showed profuse growth.

When employed as bacteriostats the present complexes may by incorporated into organic solvents say, ethanol or isopropyl alcohol or into emulsions prepared by mixing such solutions of the complex with water in the presence of an emulsifying agent. The complexes may also be admixed with soaps or synthetic detergents for use as germicidal cleansing compositions. As fungicides the trialkyl phosphite-mercuric chloride complexes are highly efficient for preventing and retarding fungus growth on textiles, fur, leather, wood, etc. They may be applied directly to the material which is to be treated, but because the complexes are effective in extremely dilute concentrations it is preferred to incorporate the present agents with a carrier or diluent.

Fungicidal, bactericidal or herbicidal dusts may be prepared by mixing the complexes with dusting materials such as talc, clay, lime, bentonite, pumice, etc. Suspensions, dispersions or emulsions of the complexes in water are advantageously employed in the treatment of plant foliage, textiles, leather, and other materials with which it is not desirable to employ either a solid carrier or an organic solvent.

What I claim is:

1. The method of inhibiting the growth of undesired living organisms selected from the class consisting of bacteria, fungus and plants which comprises exposing said organisms to a toxic quantity of a complex addition product having the formula $$\left[ \begin{array}{c} R' \\ | \\ R-P \\ | \\ R'' \end{array} \right]_n HgX_2$$

in which X is selected from the class consisting of chlorine, bromine and iodine, n is an integer of 1 to 2, and R, R' and R'' are alkoxy radicals of from 1 to 8 carbon atoms.

2. The method of inhibiting growth of bacteria which comprises exposing said bacteria to a bactericidal quantity of a complex addition product having the formula $$\left[ \begin{array}{c} R' \\ | \\ R-P \\ | \\ R'' \end{array} \right]_n HgX_2$$

in which X is selected from the class consisting of chlorine, bromine and iodine, n is an integer of 1 to 2 and R, R' and R'' are alkoxy radicals of from 1 to 8 carbon atoms.

3. The method of inhibiting fungus growth which comprises exposing said fungus to a fungicidal quantity of a complex addition product having the formula $$\left[ \begin{array}{c} R' \\ | \\ R-P \\ | \\ R'' \end{array} \right]_n HgX_2$$

in which X is selected from the class consisting of chlorine, bromine and iodine, n is an integer of 1 to 2 and R, R' and R'' are alkoxy radicals of from 1 to 8 carbon atoms.

4. The method of destroying undesirable plants which comprises applying to said plants a herbicidal quantity of a herbicidal composition comprising a complex addition product having the formula $$\left[ \begin{array}{c} R' \\ | \\ R-P \\ | \\ R'' \end{array} \right]_n HgX_2$$

in which X is selected from the class consisting of chlorine, bromine and iodine, n is an integer of 1 to 2 and R, R' and R'' are alkoxy radicals of from 1 to 8 carbon atoms.

5. The method of inhibiting the growth of undesired living organisms selected from the class consisting of bacteria, fungus and plants which comprises exposing said organisms to a toxic quantity of a complex addition product having the formula $$\left[ \begin{array}{c} CH_2CH_3 \\ | \\ O \\ | \\ CH_3CH_2-O-P \\ | \\ O \\ | \\ CH_2CH_3 \end{array} \right]_2 HgX_2$$

6. The method of inhibiting the growth of bacteria which comprises exposing said bacteria to a bactericidal toxic quantity of a complex addition product having the formula $$\left[ \begin{array}{c} CH_2CH_3 \\ | \\ O \\ | \\ CH_3CH_2-O-P \\ | \\ O \\ | \\ CH_2CH_3 \end{array} \right]_2 HgX_2$$

7. The method of inhibiting the growth of fungi which comprises exposing said fungi to a fungi toxic quantity of a complex addition product having the formula $$\left[ \begin{array}{c} CH_2CH_3 \\ | \\ O \\ | \\ CH_3CH_2-O-P \\ | \\ O \\ | \\ CH_2CH_3 \end{array} \right]_2 HgX_2$$

8. The method of destroying undesirable plants which comprises applying to said plants a herbicidal quantity of a complex addition product having the formula $$\left[ \begin{array}{c} CH_2CH_3 \\ | \\ O \\ | \\ CH_3CH_2-O-P \\ | \\ O \\ | \\ CH_2CH_3 \end{array} \right]_2 HgX_2$$

References Cited in the file of this patent

Evans et al.: "Chem. Soc. Jour.," London, July-December 1940. pp. 1209–30.

J. Am. Chem. Soc., vol. 75, August 20, 1953, pp. 3967–9.

Arbusoff: "Ber.," vol. 38, pp. 1171–3 (1905).

Chem. Absts.: 37:P3542[2] (1943) and 36:5905[6] (1942).

Frear: Catalogue, vol. 2, Chem. Fung. and Plant Insect. (1954), p. 53.